US011940810B2

(12) United States Patent
Birger et al.

(10) Patent No.: US 11,940,810 B2
(45) Date of Patent: Mar. 26, 2024

(54) METHODS AND SYSTEMS FOR DETECTION OF FALSE POSITIVES IN DETECTION OF AGRICULTURAL SPRAYING ERRORS

(71) Applicant: Agromentum Ltd., Yokne'am Illit (IL)

(72) Inventors: Iftach Birger, Yokne'am Illit (IL); Boaz Bachar, Fresno, CA (US); Tal Weksler, Yokne'am Illit (IL)

(73) Assignee: AGROMENTUM LTD., Yokne'am Illit (IL)

( * ) Notice: Subject to any disclaimer, the term of this patent is extended or adjusted under 35 U.S.C. 154(b) by 358 days.

(21) Appl. No.: 17/489,126

(22) Filed: Sep. 29, 2021

(65) Prior Publication Data
US 2022/0019234 A1 Jan. 20, 2022

Related U.S. Application Data

(63) Continuation of application No. PCT/US2020/025805, filed on Mar. 30, 2020.

(60) Provisional application No. 62/826,504, filed on Mar. 29, 2019.

(51) Int. Cl.
| | |
|---|---|
| *G05D 1/02* | (2020.01) |
| *A01B 69/04* | (2006.01) |
| *A01B 79/00* | (2006.01) |
| *G05D 1/00* | (2006.01) |

(52) U.S. Cl.
CPC ......... *G05D 1/0278* (2013.01); *A01B 69/008* (2013.01); *A01B 79/005* (2013.01); *G05D 2201/0201* (2013.01)

(58) Field of Classification Search
CPC .......... G05D 1/0278; G05D 2201/0201; A01B 69/008; A01B 79/005; B05B 12/085; B05B 12/126; A01M 7/0089
See application file for complete search history.

(56) References Cited

U.S. PATENT DOCUMENTS

| 8,634,993 B2 | 1/2014 | McClure et al. |
| 2005/0075784 A1 | 4/2005 | Gray et al. |
| 2005/0165521 A1 | 7/2005 | Gruhn |

OTHER PUBLICATIONS

Bakker, Tijmen, "An Autonomous Robot for Weed Control—Design, Navigation and Control," retrived on Jun. 16, 2020 from <https://pds.semanticscholar.org/cd45/b6274e8e65e9ef5f731e9f3927f00f27bd94.pdf> entire document, especially p. 92.

*Primary Examiner* — Alan D Hutchinson
(74) *Attorney, Agent, or Firm* — Greenberg Traurig, LLP

(57) ABSTRACT

A method includes receiving a current data sample relating to a tractor spraying in an agricultural block, wherein the current data sample includes a current location; calculating a shortest distance from the current location to each of a plurality of borders of the agricultural block; selecting a current sample lowest distance, the current sample lowest distance being a lowest one of the shortest distances; grouping the current data sample with at least one prior data sample to produce a line of data samples, wherein each of the at least one prior data sample has a corresponding prior sample lowest distance; calculating an average lowest distance for the line of samples; comparing the average lowest distance to a threshold distance; and discarding the current data sample and each of the at least one prior data sample if the average distance is less than the threshold value.

18 Claims, 11 Drawing Sheets

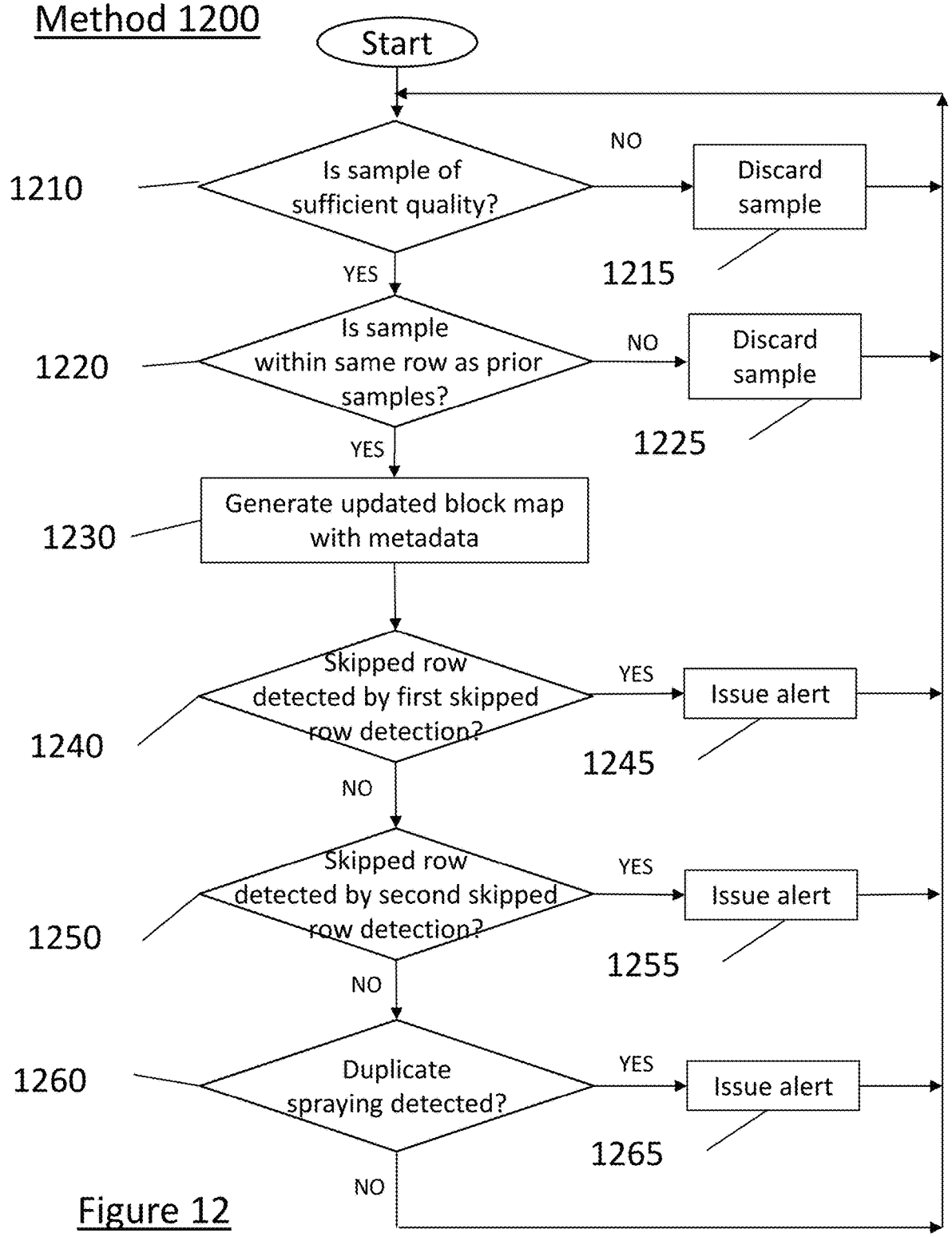

METHODS AND SYSTEMS FOR DETECTION OF FALSE POSITIVES IN DETECTION OF AGRICULTURAL SPRAYING ERRORS

CROSS-REFERENCE TO RELATED APPLICATION

This application is a Continuation of International (PCT) Patent Application No.: PCT/US2020/025805 filed Mar. 30, 2020, which relates to and claims the benefit of commonly-owned, U.S. Provisional Patent Application No. 62/826,504, filed Mar. 29, 2019, entitled "METHODS AND SYSTEMS FOR DETECTION OF FALSE POSITIVES IN DETECTION OF AGRICULTURAL SPRAYING ERRORS," the contents of which are incorporated herein by reference in their entirety.

FIELD OF THE INVENTION

The exemplary embodiments relate to methods and systems for detecting false positives during the detection of errors in the administration of materials (such as pesticides) to agricultural crops.

BACKGROUND OF THE INVENTION

Materials such as pesticides are typically administered to crops (e.g., within orchards or vineyards) at night due to favorable weather conditions. Materials are also often administered by workers who are untrained and/or unmotivated. Consequently, algorithms have been developed to detect errors that occur during administration. However, such algorithms rely on data sources that can be unreliable due to environmental factors, and therefore occasionally provide false positive results.

SUMMARY OF THE INVENTION

In an embodiment, a method for preventing false positives includes receiving a data sample relating to a tractor spraying in an agricultural block, the data sample including a location; calculating a shortest distance from the location to each of a plurality of borders of the agricultural block; selecting a current sample lowest distance, the current sample lowest distance being a lowest one of the shortest distances; grouping the data sample with at least one prior data sample to produce a line of samples, each of the at least one prior data sample having a corresponding prior sample lowest distance; calculating an average lowest distance for the line of samples, the average lowest distance being a mean average of the current sample lowest distance and all of the at least one prior sample lowest distance corresponding to each of the at least one prior sample; comparing the average lowest distance to a threshold value; and discarding the current sample and each of the at least one prior data sample if the average distance is less than the threshold value.

In an embodiment, a method for preventing false positives includes receiving a block map for an agricultural block, the block map including locations of a plurality of rows within the agricultural block; receiving a current data sample relating to a tractor spraying in the agricultural block, the data sample including a current location of the tractor; evaluating an accuracy of the current location; comparing the accuracy of the current location to a threshold accuracy; if the current location is more accurate than the threshold accuracy, determining a current location of the tractor by comparing the current location to the plurality of rows of the block map and selecting a closest one of the rows to the current location; if the current location is less accurate than the threshold accuracy, determining a current location of the tractor by comparing the current location to a plurality of recent previous locations of the tractor.

In some embodiments, a method includes receiving a current data sample relating to a tractor spraying in an agricultural block, wherein the current data sample includes a current location; calculating a shortest distance from the current location to each of a plurality of borders of the agricultural block; selecting a current sample lowest distance, the current sample lowest distance being a lowest one of the shortest distances; grouping the current data sample with at least one prior data sample to produce a line of data samples, wherein each of the at least one prior data sample has a corresponding prior sample lowest distance; calculating an average lowest distance for the line of samples; comparing the average lowest distance to a threshold distance; and discarding the current data sample and each of the at least one prior data sample if the average distance is less than the threshold value.

In some embodiments, the average lowest distance is a mean average of the current sample lowest distance and all of the at least one prior sample lowest distance corresponding to each of the at least one prior data sample.

In some embodiments, the step of grouping the current data sample with at least one prior data sample to produce a line of data samples includes grouping the current data sample with at least one consecutive prior data sample having a same action as the current data sample. In some embodiments, a method also includes the step of if no consecutive prior data sample having a same action as the current data sample exists, assigning the current data sample to a new line of data samples. In some embodiments, the action of the current data sample is determined by a process including steps of receiving a tractor speed of the tractor; comparing the tractor speed to a stop threshold speed; if the tractor speed does not exceed the stop threshold speed, determining that the tractor is stationary; if the tractor speed exceeds the stop threshold speed, determining whether the tractor is within a block; if the tractor is not within the block, determining that the tractor is driving; if the tractor is within the block, determining whether the tractor speed exceeds an operation threshold speed; if the tractor speed exceeds the operation threshold speed, determining that the tractor is driving; if the tractor speed does not exceed the operation threshold speed, determining whether the tractor has a specific action sensor; if the tractor has a specific action sensor, detecting an activity of the tractor based on the specific action sensor; if the tractor does not have a specific action sensor, determining whether the tractor has a further sensor; if the tractor has the further sensor, detecting the activity of the tractor based on the further sensor; if the tractor does not have the further sensor, determining whether the tractor has an RFID tag; if the tractor has the RFID tag, determining the tractor activity based on a default activity of the RFID tag; and if the tractor does not have the RFID tag, determining the tractor activity based on a default activity for the tractor.

In some embodiments, the current location is determined using a global navigation satellite system receiver.

In some embodiments, the threshold distance is three meters.

In some embodiments, the current location of the tractor is a received current location.

In some embodiments, the current location of the tractor is a calculated current location, and the calculated current location is determined by a process including steps of receiving a block map for an agricultural block, wherein the block map includes locations of a plurality of rows within the agricultural block; receiving a current data sample relating to a tractor spraying in the agricultural block, wherein the current data sample includes a received current location of the tractor; evaluating an accuracy of the received current location; comparing the accuracy of the received current location to a threshold accuracy; if the received current location is more accurate than the threshold accuracy, determining the calculated current location of the tractor by comparing the received current location to the plurality of rows of the block map and selecting a closest one of the rows to the received current location; if the received current location is less accurate than the threshold accuracy, determining the calculated current location of the tractor by comparing the received current location to a plurality of recent previous locations of the tractor. In some embodiments, the accuracy of the current location is received from a global navigation satellite system receiver. In some embodiments, the threshold accuracy is a predetermined accuracy. In some embodiments, the predetermined accuracy is three meters. In some embodiments, the step of comparing the current location to the plurality of recent previous locations includes determining whether the plurality of recent previous locations had good accuracy and were assigned to a line of samples, and assigning the current sample to the line of samples if the plurality of recent previous locations had good accuracy and were assigned to a line of samples.

In some embodiments, a method includes receiving a block map for an agricultural block, wherein the block map includes locations of a plurality of rows within the agricultural block; receiving a current data sample relating to a tractor spraying in the agricultural block, wherein the current data sample includes a current location of the tractor; evaluating an accuracy of the current location; comparing the accuracy of the current location to a threshold accuracy; if the current location is more accurate than the threshold accuracy, determining a current location of the tractor by comparing the current location to the plurality of rows of the block map and selecting a closest one of the rows to the current location; if the current location is less accurate than the threshold accuracy, determining the current location of the tractor by comparing the current location to a plurality of recent previous locations of the tractor.

In some embodiments, the accuracy of the current location is received from a global navigation satellite system receiver. In some embodiments, the threshold accuracy is a predetermined accuracy. In some embodiments, the predetermined accuracy is three meters. In some embodiments, the step of comparing the current location to the plurality of recent previous locations includes determining whether the plurality of recent previous locations had good accuracy and were assigned to a line of samples, and assigning the current sample to the line of samples if the plurality of recent previous locations had good accuracy and were assigned to a line of samples.

BRIEF DESCRIPTION OF THE FIGURES

FIG. 12 shows an exemplary method for detecting skipped rows and rows that have been sprayed more than once.

DETAILED DESCRIPTION

Figure 1:
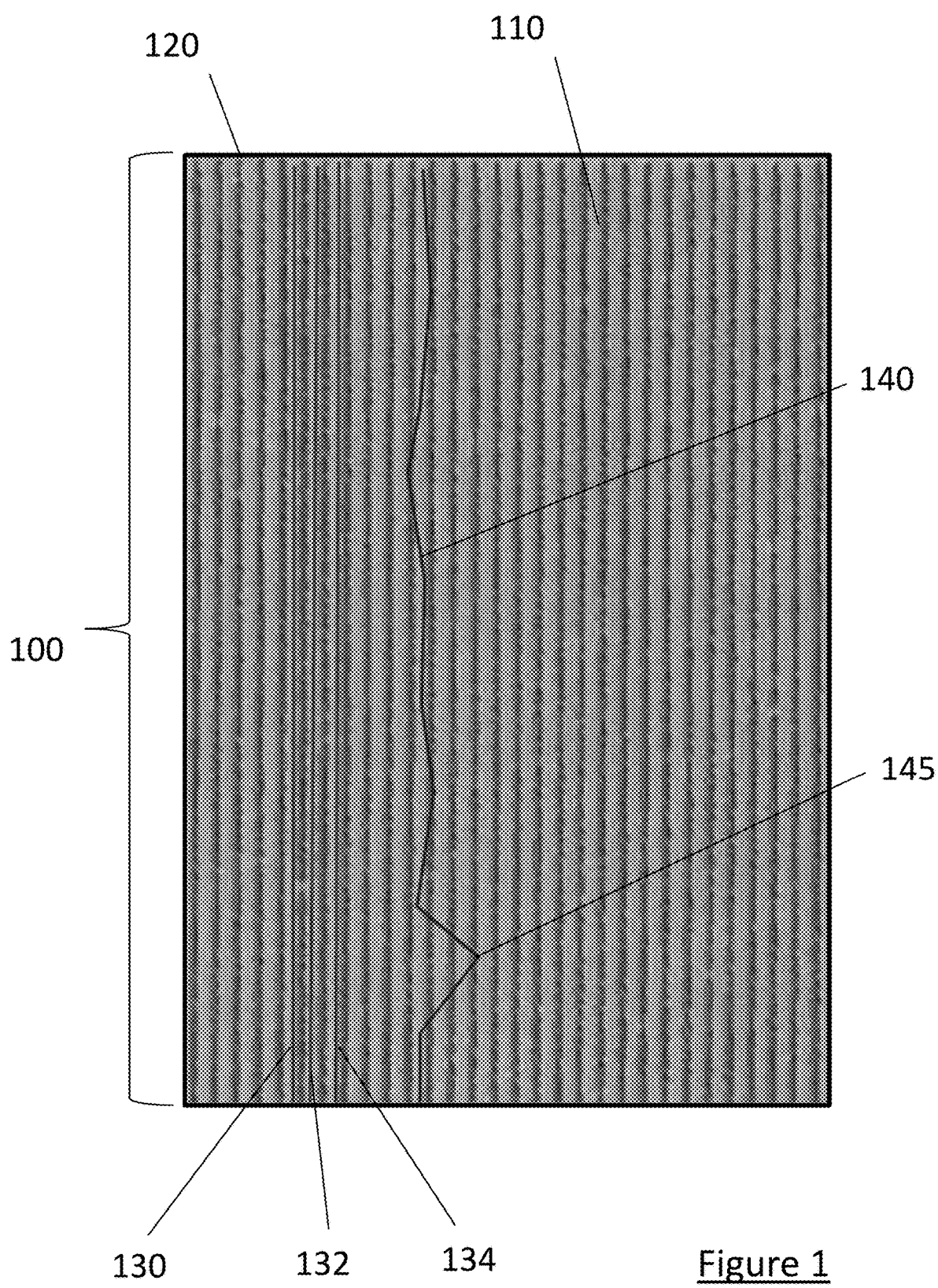
FIG. 1 shows a map of an agricultural block showing a set of location samples with inaccuracies.

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

Techniques exist for detecting errors in real time during spraying operations in orchards and vineyards. In some embodiments, such techniques involve monitoring the positions and movement of tractors engaged in spraying operations through sensors such as Global Navigation Satellite System ("GNSS") receivers. However, GNSS receivers often operate inefficiently under tree canopies such as those commonly found in orchards due to intermittent satellite visibility. Such inefficient operation presents the technological problem inaccurate location measurements, which can result in error detection techniques producing false alerts. For example, a tractor driving at a driving speed (for example, 35 kilometers per hour) on a road along an edge of a block may have an inaccurate location sample "jump" into a row within the block, causing a false positive alert due to the tractor appearing to be driving within the block at a speed faster than that appropriate for spraying operations (for example, 15 kilometers per hour). The exemplary embodiments provide technological solutions for preventing such false positives from occurring by evaluating the accuracy of received location data and using the accuracy data in conjunction with row-level block maps and known row spans to adjust the location of, or discard, data points that may lead to false positives.

FIG. 1 shows a block map 100 of a block 110 surrounded by a border 120. The block map 100 includes three straight lines 130, 132, 134 representing rows within the block 110 that may be detected during a block mapping process. A tractor that is spraying within the block 110 and having its location accurately detected would be indicated to be moving along one of the lines 130, 132, and 134, or along a line running parallel thereto. The block map 100 also includes a jagged line 140 generated based on a data set for a tractor having low-quality GNSS signal reception. The line 140 represents the movement of a tractor along a row within the block 110. However, due to signal inaccuracies, the line 140 "jumps" across rows within the block 110, such as at location 145, where the line 140 indicates a position for the tractor that is two rows removed from the actual location of the tractor. Such inaccurate location samples can lead to false alerts; for example, a sample at the location 145 can lead to an alert incorrectly being generated due to double spraying of the row including the location 145.

Figure 2:
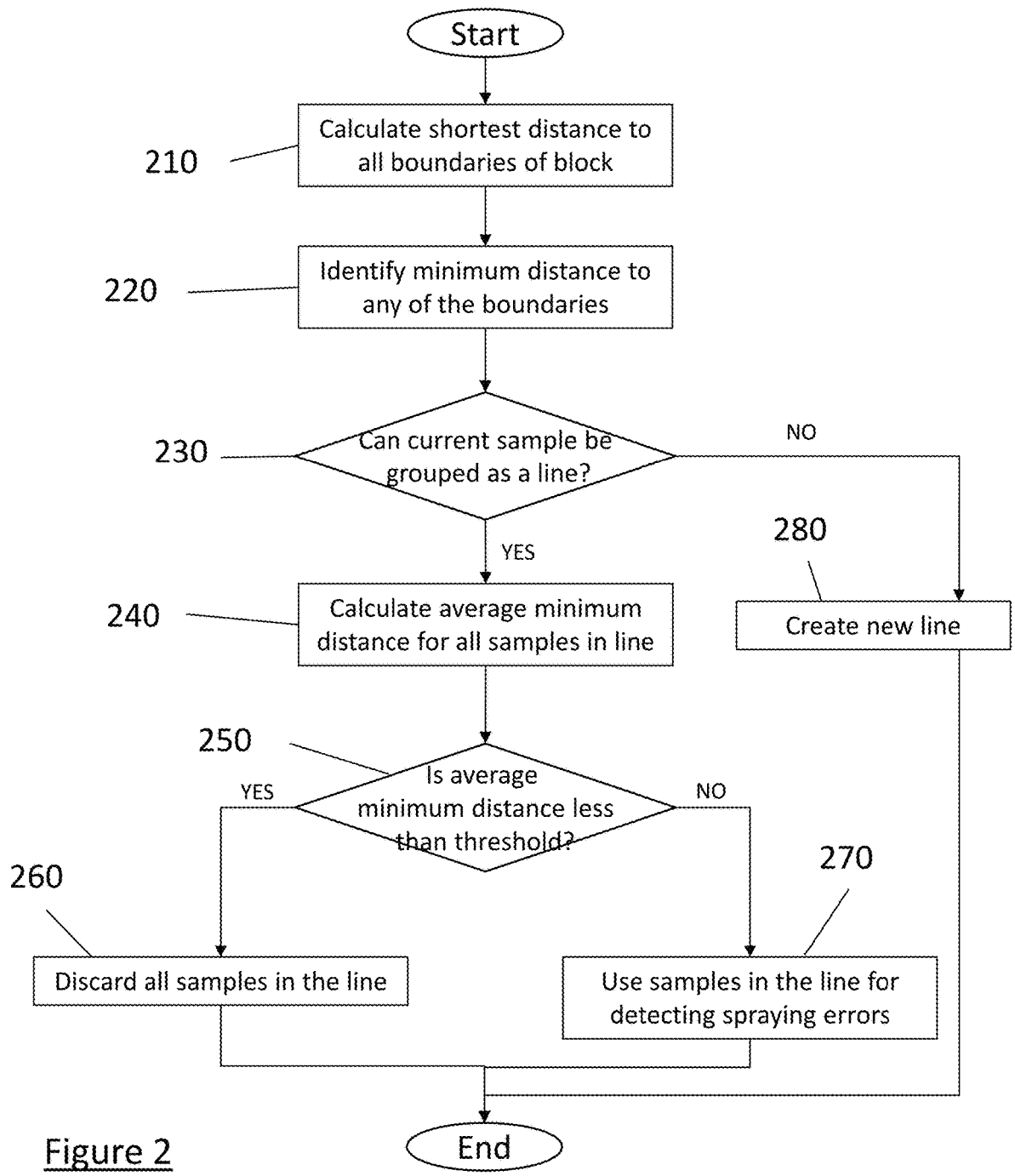
FIG. 2 shows a flowchart of a first exemplary method for detecting false positives in a process for detecting spraying errors.

In some embodiments, the present disclosure provides one technological solution based at least in part on false positive detection that is performed by generating metadata for samples received during spraying operations and using such metadata to detect false positives. In some embodiments, false positive detection is performed only for data samples that have been identified as corresponding to a tractor engaged in a spraying activity. FIG. 2 shows a flowchart of an exemplary method 200 for an exemplary technological solution of detecting false positives during the detection of agricultural spraying errors. In some embodiments, the method 200 is suitable for use in the absence of a detailed block map of the agricultural block in which spraying operations are taking place (e.g., a map as generated by the algorithm 600 described above with reference to FIG. 6). In some embodiments, the method 200 receives, as input, a map indicating the boundaries of the block, as well as GNSS data samples from one or more tractors operating within the block. In some embodiments, the method 200 is repeated each time a new data sample is received (e.g., every one second, every two seconds, every three seconds, etc.).

Figure 3:
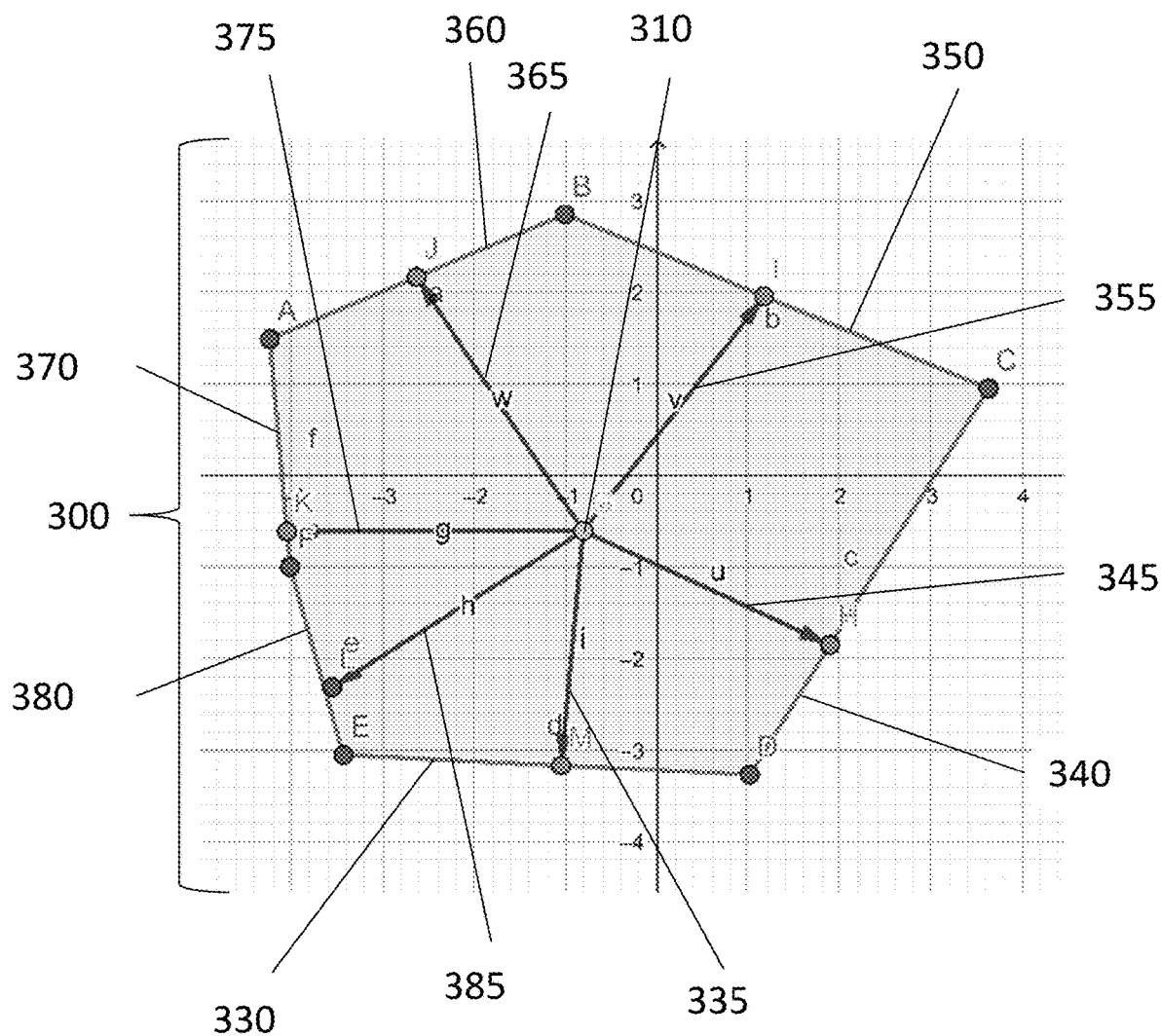
FIG. 3 shows an exemplary evaluation of a location sample during the performance of the method shown in FIG. 2.

In step 210, as one technological solution, the location of a current sample is compared to all boundary lines forming the boundary of the block polygon in which the sample was received and the shortest distance to each boundary line (i.e., along a line perpendicular to each boundary line) is calculated. FIG. 3 shows a sample map 300 that may be helpful to visualize step 210. In the map 300, a sample location 310 is located within a polygon 320 that is hexagonal (i.e., has six sides). The polygon includes six boundary lines 330, 340, 350, 360, 370, 380. The map 300 also includes six length segments 335, 345, 355, 365, 375, 385, indicating the shortest distance from the sample location 310 to each of the boundary lines 330, 340, 350, 360, 370, 380, respectively.

Referring back to FIG. 2, in step 220, as another technological solution, the shortest one of the distances calculated in step 210 is selected. The shortest distance represents the distance between the sample location and a road or other location on which a tractor might likely be driving rather than spraying. For example, referring back to FIG. 3, the length of the segment 335 from the sample location 310 to the boundary line 330 is selected. The shortest distance is then saved as metadata for the current sample.

Referring back to FIG. 2, in step 230, as another technological solution, the current sample is then compared to prior samples to evaluate whether it should be grouped with one or more prior samples as a "line of samples". In some embodiments, a line of samples is defined as a group of consecutive samples having the same action (e.g., driving, standing, spraying, etc.). Consequently, in some embodiments, the current sample is grouped with whatever number of prior consecutive samples have the same action as the current sample. In some embodiments, this process involves receiving a current sample, determining the activity of the current sample (e.g., as described with reference to the method 1000 shown in FIG. 10), and comparing the activity for the current sample to the most recent previous line for the same tractor. If the activity for the line is the same as the activity for the current sample, then the current sample is grouped with the line.

Continuing to refer to FIG. 2, if, in step 230, it is determined that the current sample cannot be grouped with any other samples to form a line, then the method proceeds to step 280. In step 280, as another technological solution, a new line is created and the current sample is assigned as the first sample of the new line. After step 280, the method 200 is complete. If, in step 230, it is determined that the current sample is grouped in a line with prior samples, then the method continues in step 240. In step 240, as another technological solution, the current line of samples, the average shortest distance to a boundary line is calculated based on averaging the shortest distances (i.e., as discussed above with reference to step 220) for all samples within the line. In step 250, as another technological solution, the average shortest distance for the line of samples is compared both to the row span for the current block and to a predetermined boundary value. In some embodiments, the predetermined boundary value is three meters.

If the average shortest distance is less than either the row span or the predetermined boundary value, then the method 200 proceeds to step 260. In step 260, as another technological solution, the line is identified as a false positive line (e.g., the line is considered to represent a tractor moving along the edge of a block rather than spraying within the block) and is eliminated from consideration in the calculation of real-time alerts. If the average shortest distance is greater than either the row span or the predetermined boundary value, then the method proceeds to step 270. In step 270, the line is retained and used for consideration in the identification of real-time alerts (e.g., as discussed with reference to FIG. 11). Following either 260 or step 270, the method 200 is complete.

Figure 4:
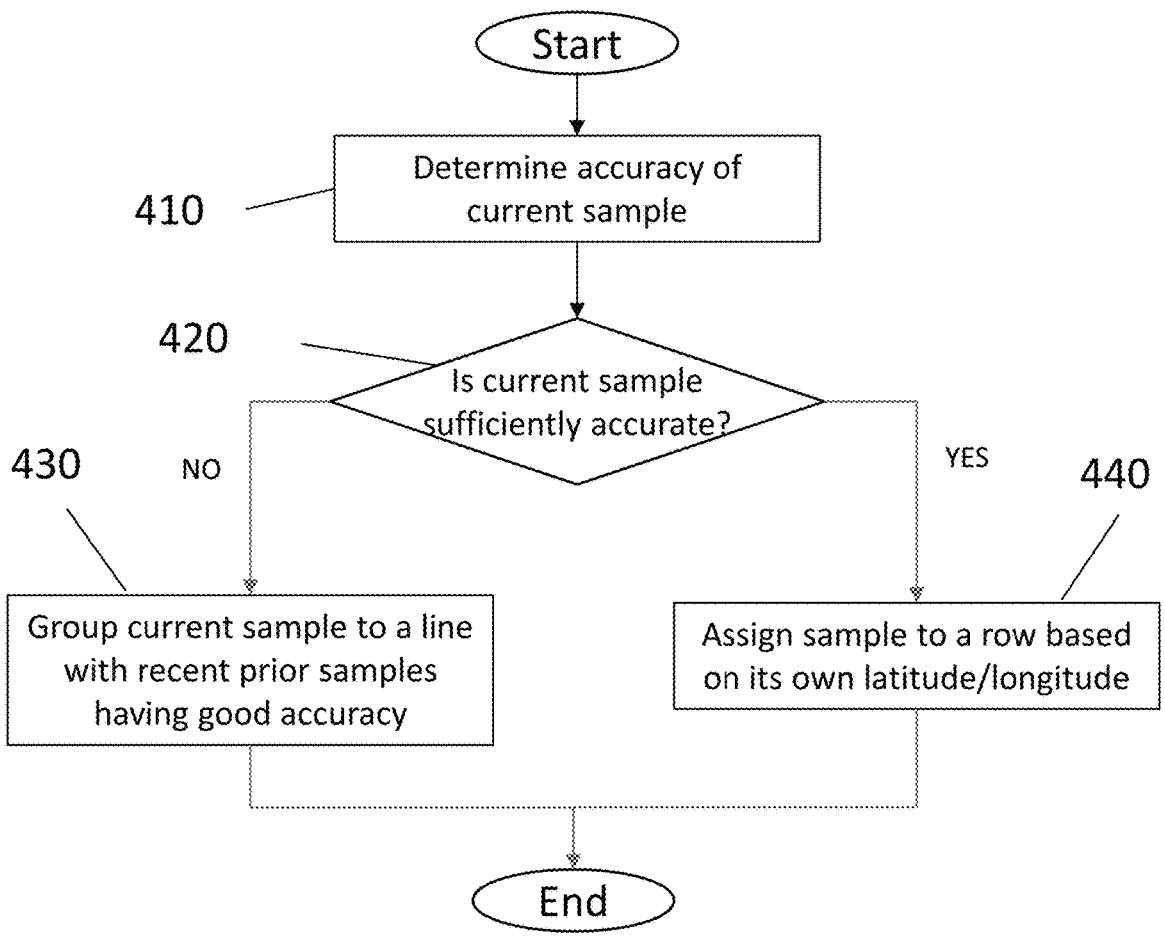
FIG. 4 shows a flowchart of a second exemplary method for detecting false positives in a process for detecting spraying errors.

FIG. 4 shows a flowchart of a second exemplary method 400 for an exemplary technological solution of detecting false positives during the detection of agricultural spraying errors. In some embodiments, the method 200 is suitable for use in conjunction with a detailed block map of the agricultural block in which spraying operations are taking place (e.g., a map as generated by the algorithm 600 described with reference to FIG. 6). In some embodiments, the method 400 receives, as input, a detailed block map, as well as GNSS data samples from one or more tractors operating within the block. In some embodiments, the method 400 is repeated each time a new data sample is received (e.g., every one second, every two seconds, every three seconds, etc.).

In step 410, as one technological solution, the accuracy of the current sample is determined. In some embodiments, each sample includes accuracy data, which may be created by the GNSS receiver according to internal factors such as number of satellites in contact, signal strength of each satellite, etc. A typical GNSS accuracy is two meters, which is typically acceptable as row gap (i.e., distance between rows of trees) is typically around five meters. However, the accuracy of GNSS receivers can be low under tree canopies such as are commonly found in orchards, and may occasionally be as poor as ten meters or worse. In cases where the accuracy is, for example, ten meters, the sample may not be able to be used, as the tractor may actually be in a different row from the one indicated by the sample.

Continuing to refer to FIG. 4, in step 420, as another technological solution, the accuracy determined in step 410 is evaluated to determine whether it is sufficiently accurate. In some embodiments, the accuracy evaluation in step 420 is performed by comparing the accuracy of the current sample to a threshold. In some embodiments, the threshold is three meters.

If, in step 420, it is determined that the accuracy is worse (i.e., a higher distance) than the threshold value, then the method proceeds to step 430. In step 430, as another technological solution, the current sample is compared to recent prior samples for the same tractor. If the prior samples had good accuracy and were assigned to a line of samples (e.g., as described above with reference to step 230), then the current sample is assigned to the same line of samples. In some embodiments, in cases where the current sample has accuracy that is worse than the threshold value and is assigned to a line as described in step 430, the line may be used for alerts based on aggregate activity over time (e.g., an alert that a row has been skipped or has been double-sprayed), but the individual sample is not considered for real-time alerts (e.g., alerts that the current speed is too high, etc.)

If, in step 420, it is determined that the accuracy is better (i.e., lower) than the threshold value, then the method proceeds to step 440. In step 440, as another technological solution, the current sample is assigned to a row by searching for the nearest row in the block map using standard distance calculation techniques based on the latitude and longitude of the current sample. In some embodiments, the location of the sample is used to assign the sample to a line (e.g., as described above with reference to step 230). In some embodiments, in cases where the current sample has accuracy that is better than the threshold value and is assigned to a row as described in step 440, the line may be used for alerts based on aggregate activity over time (e.g., an alert that a row has been skipped or has been double-sprayed), and the individual sample is considered for real-time alerts (e.g., alerts that the current speed is too high, etc.)

In some embodiments of error detection that are performed in conjunction with the false positive detection algorithms described above (e.g., the error detection methods 1100 and 1200), errors are only detected when a line of spraying is determined to be suitable for error detection. In some embodiments, for a line to be suitable for error detection, it must be sufficiently distant from the edge of a block. In some embodiments, a line is sufficiently distant from the edge if the average distance from the edge of a block is greater than a threshold value. In some embodiments, the threshold value is equal to the row span for a given block. In some embodiments, the threshold value is three meters. In some embodiments, for a line to be suitable for error detection, it must have a sufficiently large number of samples in the line (i.e., must contain a number of samples greater than a threshold number of samples). In some embodiments, the threshold number of samples is between 10 and 30. In some embodiments, the threshold number of samples is 10. In some embodiments, the threshold number of samples is about 20. In some embodiments, the threshold number of samples is 20. In some embodiments, the threshold number of samples is between 30. In some embodiments, for a line to be suitable for error detection, it must be sufficiently long (i.e., must have a length greater than a threshold length). In some embodiments, the threshold length is between 50 meters and 150 meters. In some embodiments, the threshold length is between 75 meters and 125 meters. In some embodiments, the threshold length is about 100 meters. In some embodiments, the threshold length is 100 meters.

Block Mapping

Figure 5:
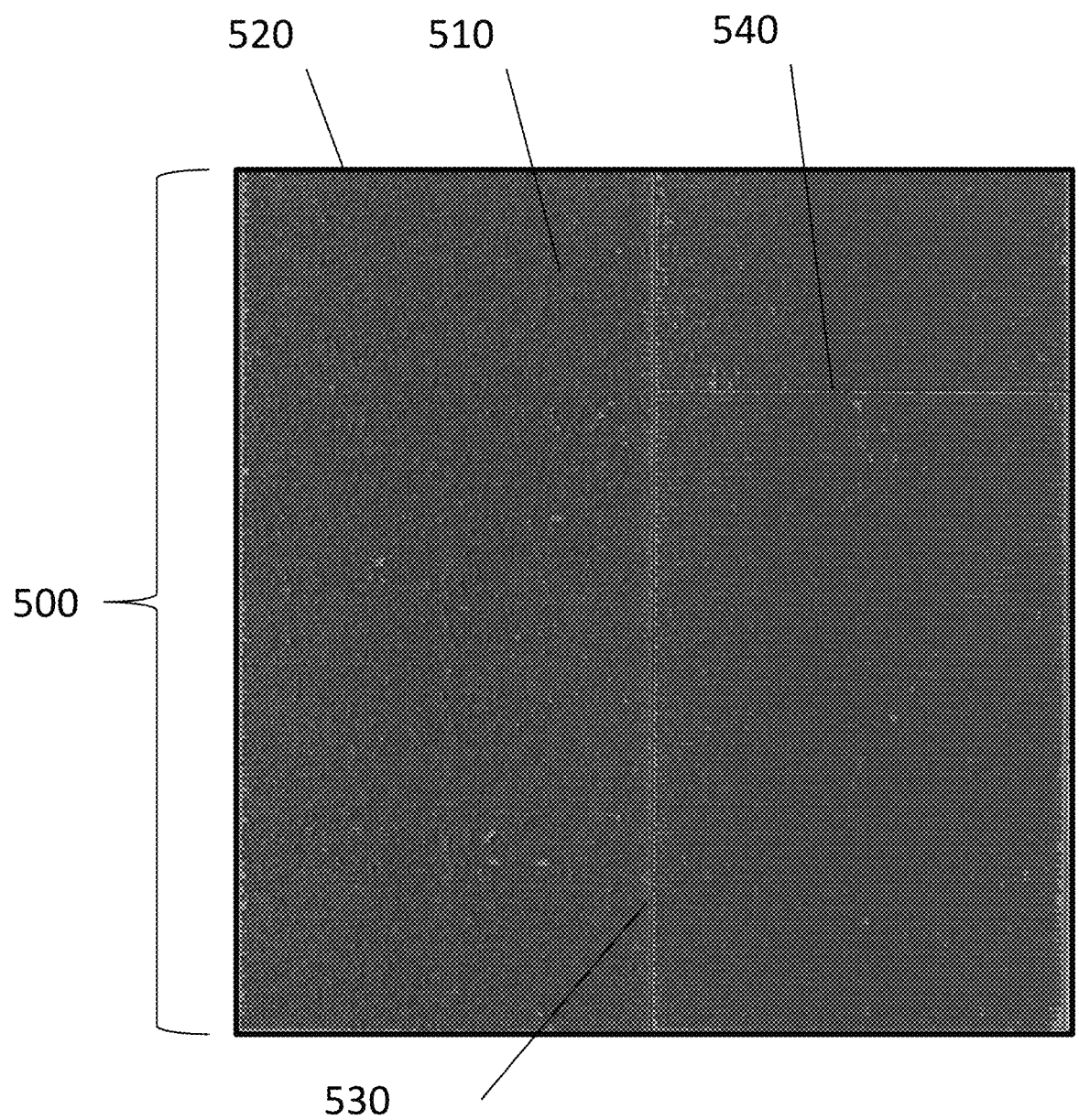
FIG. 5 shows a map of an agricultural block.

FIG. 5 shows a map 500 of a block 510 having a boundary 520. In some embodiments, a block is defined as a geographical area that a grower considers to be one block. In the block 510, rows are defined by trees planted west to east (i.e., left to right in the direction that the map 500 is oriented). The block 510 also includes a road 530 extending in a north-south direction through the center of the block and a service road 540 extending in an east-west direction from the road 530 to the boundary 520. In the block 510, trees have a row span of six meters. Consequently, as described above, if a point (e.g., a location sample from a tractor) is located at the center of a first row, points in adjacent rows may be located by "jumping" at intervals of six meters. However, due to the presence of the service road 540, such "jumping" will not arrive at an appropriate block map.

Figure 6:
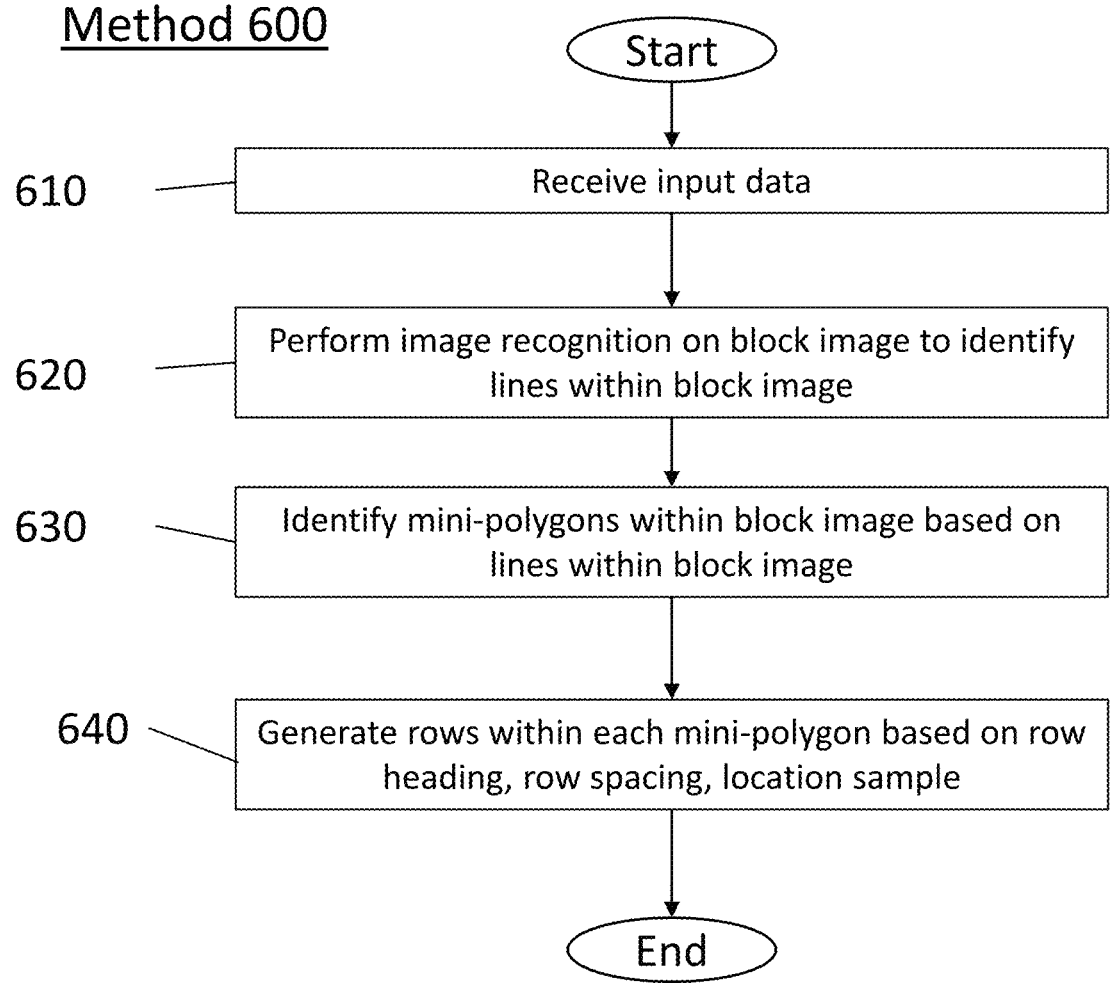
FIG. 6 shows a flowchart of an exemplary method for creating an agricultural block map.

FIG. 6 shows a flowchart of a method 600 for an exemplary technological solution of creating a block map based on the information described above. In some embodiments, the method 600 is implemented by computer-executable code executed by appropriate computer hardware. In step 610, the computer receives input data. In some embodiments, the input data includes (a) row span, (b) tree span, (c) block heading, (d) at least one image of the block, and (e) at least one GPS sample obtained at a location in a row within the block. In some embodiments, the row span is a distance (which may be expressed in, for example, meters, feet, centimeters, or any other appropriate unit). In some embodiments, the tree span is a distance (which may be expressed in, for example, meters, feet, centimeters, or any other appropriate unit). In some embodiments, the block heading is a geographical orientation (e.g., a compass heading, etc.). In some embodiments, the image is a top view image of a block (e.g., the block 510 described above with reference to FIG. 5) encoded in any known image format (e.g., TIFF, JPEG, GIF, etc.). In some embodiments, the image is obtained from open-source satellite data, which is commonly available in the United States. In some embodiments, the image is a photograph obtained through the use of a drone. In some embodiments, the image is obtained through any other suitable means for obtaining a top view image of a block. In some embodiments, the GPS sample is obtained by a tractor having an GPS receiver located within the block. In some embodiments, the GPS sample is obtained using another suitable process. In some embodiments, the GPS sample has an accuracy of less than two meters.

Continuing to refer to FIG. 6, in step 620, image recognition is performed on the block image to identify trees and roads. In some embodiments, image recognition involves the use of a feature extraction algorithm. In some embodiments, the purpose of the feature extraction is to find imperfect instances of objects within a certain class of shapes by a voting procedure. In some embodiments, the feature extraction algorithm uses a Hough transform, which is a method for finding straight lines within an image. In some embodiments, the image is binarized using thresholding and positive instances are catalogued in an example's data set.

Figure 7:
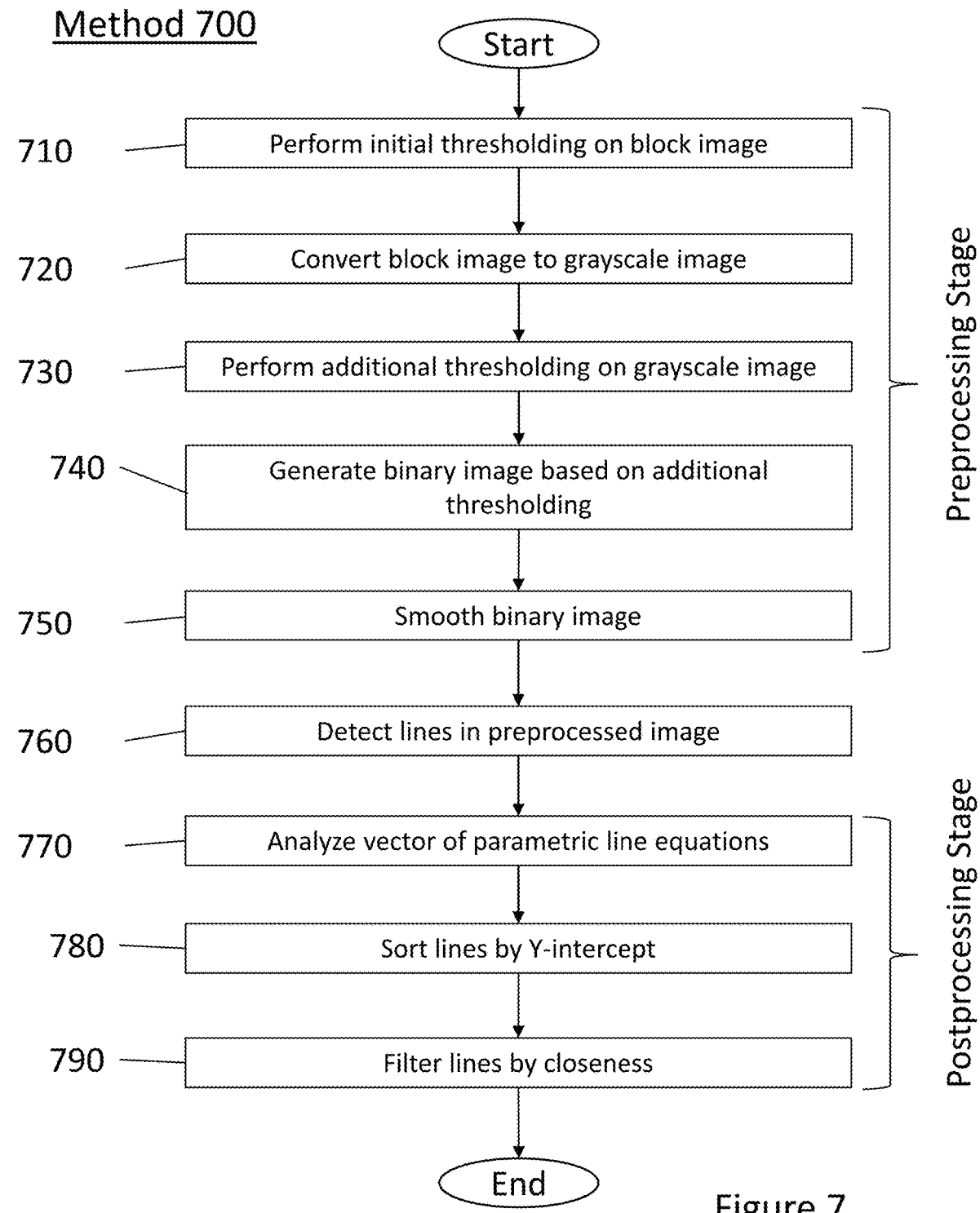
FIG. 7 shows a flowchart of an exemplary method of image processing to detect lines that is utilized during the performance of the exemplary method of FIG. 6.

FIG. 7 shows a flowchart of an exemplary method 700 of an exemplary technological solution for image recognition (e.g., the image recognition of step 620). As described above, image recognition may be performed on an image such as a satellite image of a block. In some embodiments, if necessary, the image may be converted to a suitable image format before performance of the method 700. Referring to the method 700 generally, steps 710 through 750 may be termed a "preprocessing stage" and steps 770 through 790 may be termed a "postprocessing stage."

Continuing to refer to FIG. 7, in step 710, thresholding is applied to an image. In some embodiments, the threshold value for the thresholding is calculated using Otsu's method. In step 720, the image is converted to a grayscale image using known techniques for converting color images to grayscale images (e.g., averaging, desaturation, decomposition, etc.).

Continuing to refer to FIG. 7, in step 730, additional thresholding is applied to the grayscale image produced by step 720. In some embodiments, the additional thresholding includes clustering-based thresholding. In some embodiments, the additional thresholding is performed using Otsu's method. In step 740, a binary image is generated based on the results of the additional thresholding of step 730. In step 750, the binary image is smoothed. In some embodiments, the smoothing is performed using Gaussian blurring. As noted above, following step 750, the "preprocessing" stage is complete and results in a preprocessed binary image.

Continuing to refer to FIG. 7, in step 760, lines corresponding to roads are detected in the preprocessed image. In some embodiments, detection is performed using a voting scheme. In some embodiments, only the boldest lines (which correspond to roads) are detected, while other lines (which may correspond to rows) are ignored. In some embodiments, this is accomplished using a morphologic method including steps of dilation, erosion, and dilation. In some embodiments, detection is performed using a Hough transform algorithm.

Following step 760, the "postprocessing" stage begins. In some embodiments, postprocessing may be performed in order to eliminate duplicate lines. For example, in some cases, the Hough transform algorithm may return several parallel lines, each such line spaced a couple of pixels away from the next, and all such lines may correspond to a single wide road; in such cases, postprocessing would eliminate such duplicates. In step 770, the vectors of the parametric linear line equations are analyzed and grouped. In some embodiments, this step involves identifying the vector (e.g., orientation) of each detected line. In some embodiments, lines having the same heading are grouped with one another. In step 780, the calculated lines are sorted by Y-intercept (e.g., by their intersection with a defined Y-axis). Accordingly, such lines will be ordered as the closest to the block boundary, the second closest to the block boundary, etc. In step 790, the lines are filtered by closeness to one another. In some embodiments, all lines from any given group (i.e., lines that have been grouped based on vector in step 770) are reviewed in order of Y-intercept (i.e., as determined in step 780) and all lines that any line that is less than a threshold distance from the prior line is removed so as to provide one line per road. In some embodiments, the threshold distance is the row span.

The result of the method 700 is data defining the positioning of lines within a block (for example, the positions of the road 530 and the service road 540 within the block 510 described above with reference to FIG. 5. It will be apparent to those of skill in the art that the method 700 may also be performed on an image of a block having no roads therein, in which case no lines will be output by the method 700. It will also be apparent to those of skill in the art that in some embodiments, certain steps of the method 700 are omitted. For example, if the source image is a grayscale image, steps 710 and 720 may be omitted.

As noted above, the method 700 may be the image recognition step 620 of method 600. Therefore, the output of the method 700 may be the output of step 620 of the method 600. Referring back to FIG. 6, in step 630, mini-polygons are detected within the large polygon defining the boundaries of a block. In some embodiments, mini-polygons are detected by calculating the intersection of each line output by step 620 with all other lines output by step 620 and within the boundaries of the larger polygon. Each group of intersections surrounding an area of the large block defines a mini-polygon. In one illustrative and non-limiting example, a block may include two roads R1 and R2, each of which has ends A and B, which may be referred to as R1A, R1B, R2A, and R2B. A path is traced by beginning at a vertex of the block polygon and tracing clockwise around the polygon. If the path reaches one of the road endpoints, the path being traced changes direction to follow the road (for example, along road R1 from point R1A toward point R1B, and then continuing in a clockwise direction in the same manner until a closed path has been formed, defining a mini-polygon. The process then continues around the block polygon by returning to the point at which the polygon was originally left (in the example above, at point R1A) and continuing likewise around the block polygon until the original starting point has been reached.

Figure 8:
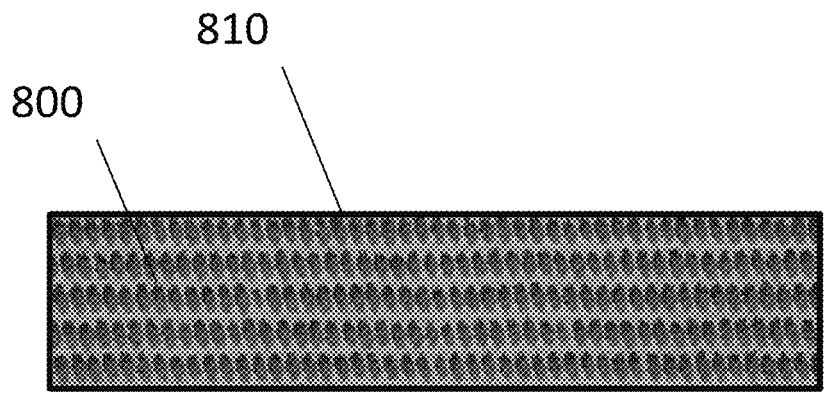
FIG. 8 shows an exemplary polygon generated based on lines detected by the exemplary method shown in FIG. 7.

For example, referring to the block 500 shown in Figure A, the path would begin at the top left corner of block 500, trace clockwise to the top end of line 530, travel along line 530 to the bottom end of line 530, and continue clockwise to the bottom left corner of block 500 and back to the top left corner of block 500. Next, the process would return to the top end of line 530 and trace clockwise to the top right corner of block 500, to the right end of line 540, to the left end of line 540, and back to the top end of line 530. Last, the process would return to the right end of line 540 and trace to the bottom right corner of block 500, to the bottom end of line 530, to the left end of line 540, and back to the right end of line 540. At this point, the entirety of the block 500 has been subdivided into sub-polygons. FIG. 8 shows an example of a mini-polygon 800 that may be generated by step 630. The mini-polygon 800 includes a boundary 810 that may be defined by a combination of the boundaries of a block polygon and lines detected in step 620.

Referring back to FIG. 6, the result of step 630 is a mini-polygon (e.g., the mini-polygon 800 shown in FIG. 8) that contains only trees and rows between trees, and does not include roads (other than at its boundaries). In step 640, geographical lines defining rows within the mini-polygon are generated. In addition to the boundaries of the mini-polygon, step 640 uses as input the row heading, the row span, and a latitude-longitude location sample of a point at a center of a row within the mini-polygon, all of which are inputs received in step 610. During step 640, the latitude-longitude location sample is used as a starting point. From the starting point, a starting line is drawn along the row heading in both directions until the boundaries of the mini-polygon are reached. Lines parallel to the starting line are then generated to either side of the starting line, spaced from the starting line by the row span, until the boundaries of the mini-polygon are reached. In some embodiments, step 640 is repeated for each of a plurality of mini-polygons generated by step 630.

In some embodiments, the method 600 also includes step 650, in which a tree-level map is generated. In step 650, lines of trees are generated based on the rows identified in step 640 and the tree span. In some embodiments, a line of trees is assumed to exist between each row identified in step 640 and the adjacent rows/mini-polygon boundary. In some embodiments, for each assumed line of trees, a first tree is located at one end of the line adjacent a boundary of the mini-polygon, and subsequent trees are located regularly at intervals equal to the tree span until the opposite end of the mini-polygon is reached.

Figure 9:
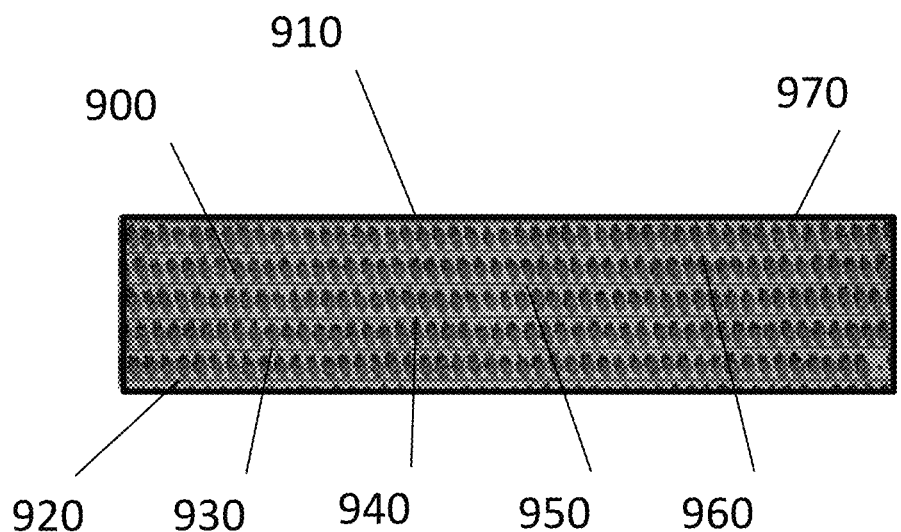
FIG. 9 shows an exemplary block map generated based on the method of FIG. 7.

Following step 640 (or step 650 in embodiments in which this step is included), the method 600 is complete. The result of the method 600 is block maps for one or more mini-blocks within a block. FIG. 9 shows a block map 900 generated based on the mini-polygon 800 shown in FIG. 8. The block map 900 includes a boundary 910 (e.g., as determined by step 630) and rows 920, 930, 940, 950, 960, and 970 (e.g., as determined by step 640).

Error Detection

In some embodiments, error detection includes the use of an action detection algorithm. In some embodiments, action detection takes place through the use of sensors that are located on a tractor (e.g., integral within a tractor; part of an external device that is installed on a tractor). In some embodiments, sensors include a Global Navigation Satellite System ("GNSS") receiver, which is in communication with a constellation of satellites and which is capable of determining the location, speed, and heading of a tractor in accordance with known techniques. A GNSS may be, for example, the Global Positioning System ("GPS") operated by the United States, the Globalnaya Navigatsionnaya Sputnikovaya Sistema ("GLONASS") operated by Russia, the BeiDou Navigation Satellite System operated by China, the Galileo system operated by the European Union, or another comparable system. In some embodiments, sensors are also capable of reading data from a tractor's engine.

Figure 10:
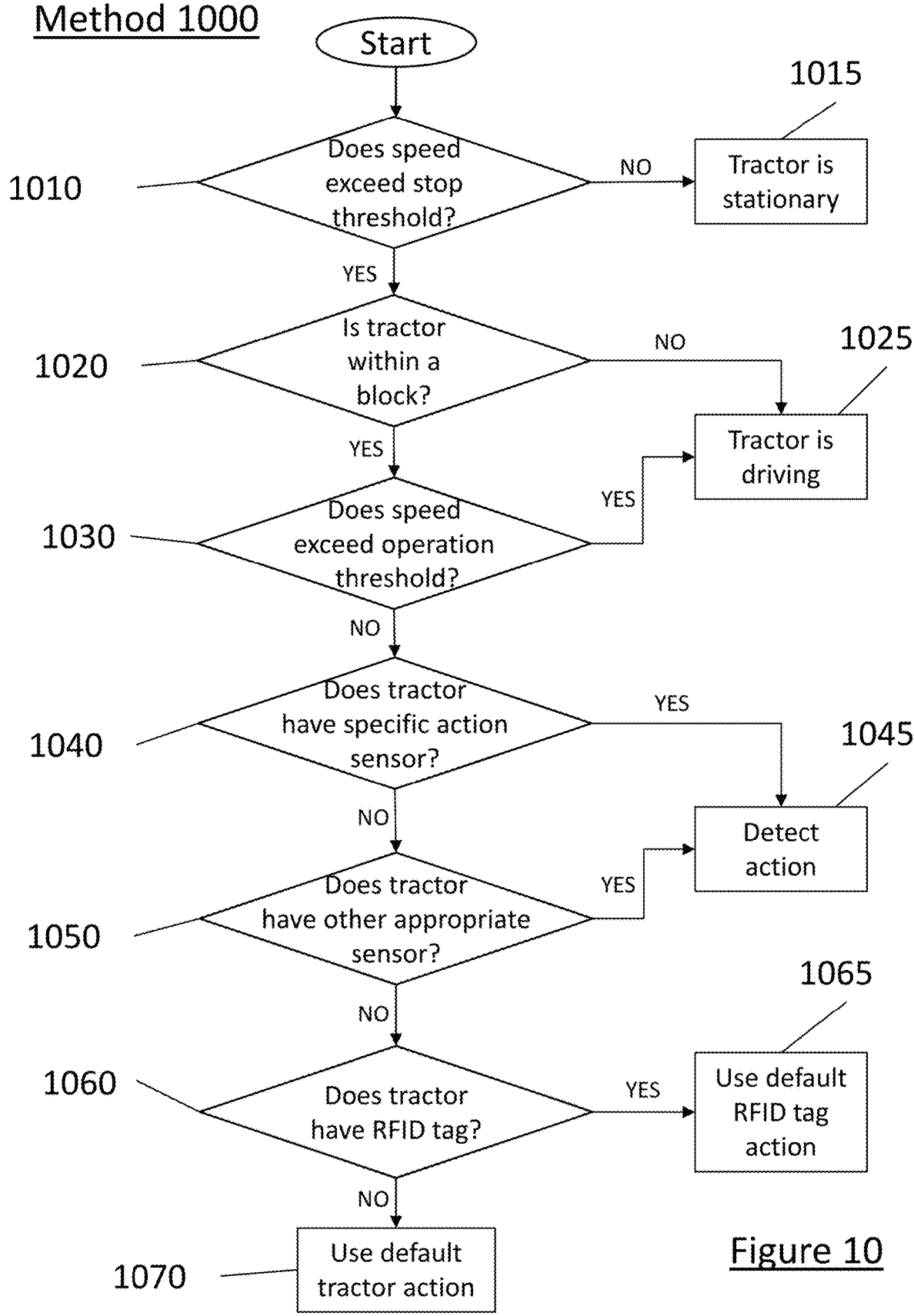
FIG. 10 shows an exemplary method for detecting the current operations of a tractor.

Although some tractors include a spraying on/off switch in their cabins, it is not always possible for sensors to tell whether a tractor is spraying based on this switch. Moreover, in some cases, spraying on/off switches are left in an "on" position even while spraying is not ongoing, such as when no spraying equipment is connected to a tractor. Consequently, in the exemplary embodiments, an action detection algorithm involves determining whether a tractor is spraying without reference to a cabin-located spraying on/off switch. FIG. 10 shows a flowchart of a method 1000 for an exemplary technological solution of detecting a tractor's actions. In some embodiments, the method 1000 is repeated on an ongoing basis (for example, every second, every two seconds, every three seconds, etc.) at all times when a tractor is operating. In some embodiments, the method 1000 is implemented through the use of computer-executable instructions embodied in a medium and executed by appropriate computer hardware.

In step 1010, the speed of the tractor is determined and compared to a threshold. In some embodiments, the speed is determined based on GNSS data. In some embodiments, the speed is determined based on the tractor's engine and related equipment (e.g., speedometer). In some embodiments, the threshold is 0.5 kilometers per hour. If the tractor's speed is less than the threshold, then the method 1000 concludes in step 1015 with a determination that the tractor is stationary. If the tractor's speed is greater than the threshold, then the method continues to step 1020.

In step 1020, the location of the tractor is determined and compared to one or more block maps to determine whether the tractor is within a block. In some embodiments, the block maps are those generated by the mapping method 600 described with reference to FIG. 6. In some embodiments, the location is determined based on GNSS data. If it is determined that the tractor is not within a block (for example, located externally to a block; located on a road that extends around a block; located on a road or path within a block), then the method concludes in step 1025 with a determination that the tractor is driving (i.e., not spraying). If it is determined in step 1020 that the tractor is within a block, then the method continues to step 1030.

In step 1030, the speed of the tractor is compared to an operation speed (e.g., a maximum speed for spraying operations). In some embodiments, the speed previously determined in step 1010 is again used in step 1030. In some embodiments, the speed is freshly determined (such as based on GNSS data or the tractor's internal equipment, as described above with reference to step 1010). In some embodiments, the operation speed is operation-specific (e.g., based on the specific material that a tractor is to be administering). In some embodiments, the operation speed is block-specific (e.g., based on the topography or crop in a specific block). In some embodiments, the operation speed is based on historical data (e.g., the usual recommended speed for a given tractor). In some embodiments, the operation speed is a predetermined value (e.g., 20 kilometers per hour). In some embodiments, if the speed is greater than the operation speed, then the method concludes in step 1025 with a determination that the tractor is driving (i.e., not spraying). If it is determined in step 1030 that the tractor is not exceeding operation speed, then the method continues to step 1040.

In step 1040, the method determines whether the tractor has an action sensor. In some embodiments, the action sensor is a sensor that is capable of assessing the state of a tractor's spraying hardware to determine the tractor's action (e.g., whether the tractor is presently spraying). In some embodiments, the action sensor is a flowmeter. If it is determined in step 1040 that the tractor has an action sensor, then the method proceeds to step 1045, in which the output of the action sensor is evaluated to detect the action of a tractor (e.g., if the action sensor is a flowmeter, then the traction is determined to be spraying if the flow rate detected by the flowmeter exceeds a threshold value). If it is determined in step 1040 that the tractor does not have an action sensor, then the method continues to step 1050.

In step 1050, the method determines whether the tractor has another sensor from which its action can be derived. For example, the other sensor might be a sensor that is primarily used for another type of action. In some embodiments, the other type of sensor is an electric valve. In some embodiments, the other type of sensor is a power take-off ("PTO") sensor. If it is determined in step 1050 that the tractor has another suitable sensor, then the method proceeds to step 1055, in which the output of the sensor is evaluated to detect the action of a tractor. If it is determined in step 1050 that the tractor does not have an action sensor, then the method continues to step 1060.

In step 1060, the method determines whether the tractor has an RF tag associated with its equipment. In some embodiments, such an RF tag will store data indicating the planned activity for a tractor, and can be interrogated using standard techniques to obtain this data. If it is determined in step 1060 that the tractor has an RF tag sensor, then the method proceeds to step 1065, in which the action of the tractor is assumed to be the default action corresponding to the RF tag. If it is determined in step 1060 that the tractor does not have an RF tag, then the method continues to step 1070.

In step 1070, if the determination of a tractor's action cannot be made based on any of the above, then the tractor's action is assumed to be the tractor's default action, which may be known on a per-tractor basis. In cases where a farm has RF identification capabilities (i.e., tractors engaged in spraying activities may be identified based on an RF tag as discussed above with reference to step 1060), the default action for tractors may be set to "working". In cases where a farm does not have RF identification capabilities (i.e., tractor activities cannot be identified based on an RF tag as described above with reference to step 1060), the default activity can be set to spraying or other activities as needed (for example, may be set to "spraying" during times of day when spraying activities are planned). Following step 1070, the method 1000 has been completed for a given sample. However, as noted above, the method 1000 may be repeated on an ongoing basis while a tractor is operating.

Typically, tractors that are engaged in spraying operations within a block are operated in accordance with a set of operational parameters (e.g., recommended speed within the block, materials to spray within the block, product information such as application temperature, spraying volume, etc.), which are referred to herein as a "recommendation". The recommendation is determined by the grower who controls the block, but is not always provided as an input for an error detection method. The exemplary spraying error detection algorithm described herein may be applicable either in cases where a recommendation is provided or in cases where no recommendation is provided.

Figure 11:
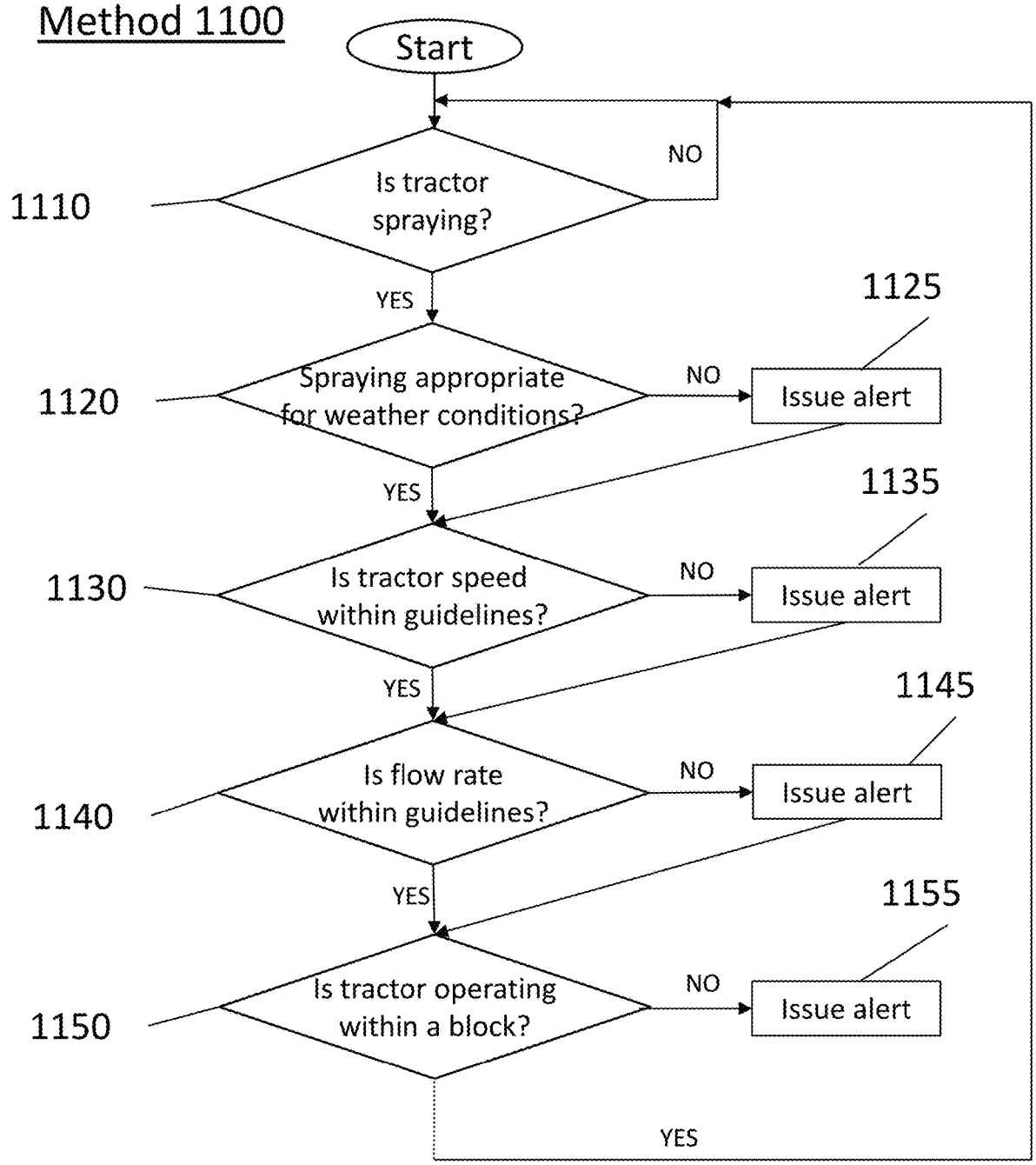
FIG. 11 shows an exemplary method for detecting spraying errors in real time.

FIG. 11 shows a flowchart of an exemplary method 1100 of an exemplary technological solution for detecting spraying errors by a tractor on an ongoing basis. The method 1100 uses as input (1) a block map, such as determined by the method 600 described with reference to FIG. 6, (2) the row span between rows of trees within the block, (3) GNSS data for the tractor being monitored, (4) the current flow rate being sprayed (if available), (5) current weather conditions (e.g., temperature, wind, humidity, etc.), (6) the type of crop planted within the block, (7) the year the crop was planted in the block, (8) the size of the trees and canopy within the block, (9) the recommendation, if available, and (10) the current activity of the tractor, such as determined by the method 1000 described above with reference to FIG. 10. In some embodiments, the method 1100 is performed on an ongoing basis (e.g., executed every second, every two seconds, every three seconds, etc.) in order to detect errors in real time.

In step 1110, the tractor activity is evaluated to determine whether spraying is currently taking place. If the tractor is not spraying (e.g., is stopped or driving), then no further action is called for, and the method returns to step 1110 (e.g., for step 1110 to be repeated at periodic intervals). If the tractor is spraying, then the method continues to step 1120.

In step 1120, the current spraying activity is compared to current weather conditions to determine whether spraying is being performed in an inappropriate manner. In some embodiments, the weather conditions include wind speed. In some embodiments, current wind speed is compared to a best practice wind speed (e.g., a default maximum wind speed for the material being administered) to determine whether the material is being administered at too high a wind speed. In some embodiments, the default maximum wind speed is 30 kilometers per hour. In some embodiments, the default maximum wind speed is in the range between 20 kilometers per hour and 40 kilometers per hour. In some embodiments in which a recommendation is provided, current wind speed is compared to a maximum wind speed in the recommendation to determine whether the material is being administered at too high a wind speed. In some embodiments, the weather conditions include humidity. In some embodiments, current humidity is compared to a best practice humidity (e.g., a default minimum humidity for the material being administered) to determine whether the material is being administered at too low a humidity. In some embodiments, the default minimum humidity is thirty percent. In some embodiments, the default minimum humidity is in the range between twenty percent and forty percent. In some embodiments in which a recommendation is provided, current humidity is compared to a minimum humidity in the recommendation to determine whether the material is being administered at too low a humidity. In some embodiments, the weather conditions include temperature. In some embodiments, current temperature is compared to a best practice temperature (e.g., a default maximum temperature for the material being administered) to determine whether the material is being administered at too high a temperature. In some embodiments, the default maximum temperature is thirty degrees Celsius. In some embodiments, the default temperature is in the range between twenty-five and thirty-five degrees Celsius. In some embodiments in which a recommendation is provided, current temperature is compared to a maximum temperature in the recommendation to determine whether the material is being administered at too high a temperature. In some embodiments, the weather conditions include more than one of wind speed, humidity, and temperature (e.g., two or all three of these parameters). If the current weather conditions are not in accordance either with best practice or recommendations (e.g., the wind speed is too high, the humidity is too low, and/or the temperature is too high), then the method continues to step 1125.

In step 1125, an alert is issued to alert a relevant entity to administration not in keeping with weather guidelines. In some embodiments, the alert is provided to a grower (e.g., an individual who is operating or monitoring a farm including the block being monitored). In some embodiments, the alert is provided to an individual who is operating the tractor being monitored. In some embodiments, the alert is provided as an instruction to an autonomously operated tractor. Following step 1125, the method continues to step 1130.

Referring back to step 1120, if the current weather conditions are found to be in accordance with best practice and/or recommendations, then the method proceeds directly from step 1120 to step 1130. In step 1130, the tractor's driving speed is compared to a speed guideline. In embodiments in which a recommendation has been provided, the speed guideline in the recommendation is used. In some embodiments, at least one range calculated based on the speed guideline is used. In some embodiments, a "low speed" range is between 70% and 90% of the speed guideline, with speeds less than 70% of the speed guideline presumed not to correspond to spraying activities and speeds greater than 90% of the speed guideline being sufficiently fast not to be considered "low speed". In some embodiments, a "high speed" range is between 110% and 130% of the speed guideline, with speeds greater than 130% of the speed guideline presumed not to correspond to spraying activities (i.e., the tractor is likely driving rather than spraying) and speeds less than 110% of the speed guideline being sufficiently slow not to be considered "high speed." Thus, for example, if the guideline speed is 3 kilometers per hour, then "low speed" alerts would be triggered based on speeds of between 2.1 and 2.7 kilometers per hour and "high speed" alerts would be triggered based on speeds of between 3.3 and 3.9 kilometers per hour. In embodiments in which no recommendation has been provided, an average speed of other tractors operating within the same block is calculated and the average speed of other tractors is used as the guideline speed. It will be apparent to those of skill in the art that use of the average speed of other tractors as a guideline speed is only a practical solution if there are at least two other tractors (i.e., three total tractors) operating in a block in a given time; accordingly, in embodiments in which no recommendation has been provided and there are not at least three total tractors operating in a block at a given time, step 1130 is skipped and the method proceeds directly from step 1120 to step 1140. If the current speed is not in accordance with the speed guideline, then the method continues to step 1135.

In step 1135, an alert is issued to alert a relevant entity to administration not in keeping with speed guidelines. In some embodiments, the alert is provided to a grower (e.g., an individual who is operating or monitoring a farm including the block being monitored). In some embodiments, the alert is provided to an individual who is operating the tractor being monitored. In some embodiments, the alert is provided as an instruction to an autonomously operated tractor. Following step 1135, the method continues to step 1140.

Referring back to step 1130, if the current speed is found to be in accordance with guidelines, then the method proceeds directly from step 1130 to step 1140. In step 1140, the spraying flow rate (e.g., in gallons per acre) is compared to guidelines. In some embodiments, flow rate is received from sensors mounted on the tractor (e.g., a flowmeter). In some cases, a tractor does not have a flowmeter; in some embodiments of the method 1100 performed in relation to such tractors, step 1140 is skipped and the method proceeds directly from step 1130 to step 1150. In embodiments in which a recommendation has been provided, the flow rate guideline in the recommendation is used. In some embodiments, the current flow rate is considered to meet the guideline if it is within an acceptable range around the guideline. In some embodiments, the range is plus or minus twenty percent. In some embodiments, the range can be configured by an administrator, such as a farm operator. In embodiments in which no recommendation has been provided, an average flow rate of other tractors operating within the same block is calculated and the average flow rate of other tractors is used as the guideline flow rate. It will be apparent to those of skill in the art that use of the average flow rate of other tractors as a guideline flow rate is only a practical solution if there are at least two other tractors (i.e., three total tractors) operating in a block in a given time; accordingly, in embodiments in which no recommendation has been provided and there are not at least three total tractors operating in a block at a given time, step 1140 is skipped and the method proceeds directly from step 1130 to step 1150. If the current flow rate is not in accordance with the flow rate guideline, then the method continues to step 1145.

In step 1145, an alert is issued to alert a relevant entity to administration not in keeping with flow rate guidelines. In some embodiments, the alert is provided to a grower (e.g., an individual who is operating or monitoring a farm including the block being monitored). In some embodiments, the alert is provided to an individual who is operating the tractor being monitored. In some embodiments, the alert is provided as an instruction to an autonomously operated tractor. Following step 1145, the method continues to step 1150.

Referring back to step 1140, if the current flow rate is found to be in accordance with guidelines, then the method proceeds directly from step 1140 to step 1150. In step 1150, the activity of the tractor is evaluated to determine whether the tractor is operating in the correct block. In this step, the location of the tractor (e.g., determined using GNSS data) is compared to the boundaries of blocks that have received recommendations. If the tractor is in a block that has not received a recommendation, then the method proceeds to step 1155, in which an alert is issued to alert a relevant entity to spraying in an incorrect block. If the tractor is within a block that has received a recommendation, then the method returns to step 1110 so that ongoing monitoring can continue. It will be apparent to those of skill in the art that steps 1150 and 1155 may be omitted in cases where no recommendations have been provided by a grower, in which case the method would proceed from step 1140 directly back to step 1110.

FIG. 12 shows a flowchart of a method 1200 of an exemplary technological solution for detecting rows that have been skipped or duplicatively sprayed during spraying operations within a block. The method 1200 uses as input (1) a block map, such as determined by the method 600 described with reference to FIG. 6, and (2) GNSS data for each of one or more tractors operating within the block. The method 12000, like the method 1100, may operate continuously while spraying operations are ongoing.

In step 1210, a current sample is received and evaluated to determine whether its accuracy is of sufficient quality for use. Typical accuracy for GNSS location is within two meters, which is sufficient for use as row gap is typically around five meters. However, GNSS location data can be unreliable under tree cover, and can often be on the order of ten meters, which is insufficient for use as the sample might be located within a different row. Therefore, the accuracy of a current reading is compared to a threshold value. In some embodiments, the threshold value is three meters. If the accuracy is worse than the threshold value, then the method proceeds to step 1215, in which the current sample is discarded. After step 1215, the method returns to step 1210 to evaluate a next sample. If the accuracy is better than the threshold value, the method proceeds to step 1220.

In step 1220, the sample is compared to the block map to find the row within the block map that is nearest to the latitude/longitude of the sample. Next, the sample is compared to prior samples from the same tractor to determine whether the current sample is within the same row as prior samples. If it is determined that the current sample is not within the same row as prior samples, then the method continues to step 1225, in which the current sample is discarded. After step 1225, the method returns to step 1210 to evaluate a next sample. If it is determined that the current sample is within the same row as prior samples, then it is assigned to that row and the method continues to step 1230.

In step 1230, an updated version of the block map is generated in which each row is marked with the tractors that sprayed within the row. In particular, for each row within the block, in step 1230 the system calculates the percentage of the row that each tractor has sprayed. For each row, metadata is generated in this step. In some embodiments, the metadata includes the identities of the tractors that drove through the row. In some embodiments, the metadata includes the coverage percentage of each tractor that drove through the row (in some cases, a tractor may only have driven over a portion of a row).

In step 1240, a first skipped row detection step takes place. In the first skipped row detection step, a row that has not been sprayed (i.e., the updated block map generated in step 1230 indicates that no tractors have sprayed a given row) is compared to the adjacent rows to either side. If the adjacent rows have both been sprayed, the row that has not been sprayed is considered a candidate row possibly not to have been sprayed. The candidate row is then considered over a predetermined time period to evaluate whether it continues to be the case over the predetermined time period that the candidate row has not been sprayed. In some embodiments, the time period is one hour. If the time period elapses and the candidate row still has not been sprayed, then the candidate row is considered to be a skipped row and the method continues to step 1245, in which an alert is issued (e.g., to a grower, to a tractor operator, etc.). If this is not the case, the method continues to step 1250. It will be apparent to those of skill in the art that more than one row at a time within a field may be considered as a candidate row in the first skipped row detection step.

In step 1250, a second skipped row detection step takes place. In the second skipped row detection step, more than adjacent row that has not been sprayed (i.e., rows that do not meet the test of step 1240) during spraying within a block are deemed to be candidate rows not to have been sprayed. The candidate rows are then considered over a predetermined time period to evaluate whether it continues to be the case over the predetermined time period that the candidate rows have not been sprayed. In some embodiments, the time period is between 6 hours and 18 hours. In some embodiments, the time period is between 8 hours and 16 hours. In some embodiments, the time period is between 10 hours and 14 hours. In some embodiments, the time period is between 11 hours and 13 hours. In some embodiments, the time period is about 12 hours. In some embodiments, the time period is 12 hours. If the time period elapses and the candidate rows have still not been sprayed, then the candidate rows are considered to be skipped rows and the method continues to step 1255, in which an alert is issued (e.g., to a grower, to a tractor operator, etc.). If this is not the case, the method continues to step 1260. It will be apparent to those of skill in the art that more than one group of adjacent rows at a time within a field may be considered as candidate rows in the second skipped row detection step.

In step 1260, rows that have been detected in step 1230 to have been sprayed by more than one tractor are analyzed to evaluate which tractor is responsible for the duplication of spraying. In some embodiments, identification of the responsible tractor is performed by identifying which tractor has deviated from an assigned pattern (e.g., every row, every other row, etc.). Following this determination, in step 1265 an alert is issued (e.g., to a grower, to a tractor operator, etc.). Following step 1265, the method returns to step 1210 for consideration of subsequent samples.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A method, comprising:
  receiving a current data sample relating to a tractor spraying in an agricultural block, wherein the current data sample includes a current location;
  calculating a shortest distance from the current location to each of a plurality of borders of the agricultural block;
  selecting a current sample lowest distance, the current sample lowest distance being a lowest one of the shortest distances;
  grouping the current data sample with at least one prior data sample to produce a line of data samples, wherein each of the at least one prior data sample has a corresponding prior sample lowest distance;
  calculating an average lowest distance for the line of samples;
  comparing the average lowest distance to a threshold distance; and
  discarding the current data sample and each of the at least one prior data sample if the average distance is less than the threshold value.

2. The method of claim 1, wherein the average lowest distance is a mean average of the current sample lowest distance and all of the at least one prior sample lowest distance corresponding to each of the at least one prior data sample.

3. The method of claim 1, wherein the step of grouping the current data sample with at least one prior data sample to produce a line of data samples comprises grouping the current data sample with at least one consecutive prior data sample having a same action as the current data sample.

4. The method of claim 3, further comprising the step of:
  if no consecutive prior data sample having a same action as the current data sample exists, assigning the current data sample to a new line of data samples.

5. The method of claim 3, wherein the action of the current data sample is determined by a process including steps of:
  receiving a tractor speed of the tractor;
  comparing the tractor speed to a stop threshold speed;
  if the tractor speed does not exceed the stop threshold speed, determining that the tractor is stationary;
  if the tractor speed exceeds the stop threshold speed, determining whether the tractor is within a block;
  if the tractor is not within the block, determining that the tractor is driving;
  if the tractor is within the block, determining whether the tractor speed exceeds an operation threshold speed;
  if the tractor speed exceeds the operation threshold speed, determining that the tractor is driving;
  if the tractor speed does not exceed the operation threshold speed, determining whether the tractor has a specific action sensor;
  if the tractor has a specific action sensor, detecting an activity of the tractor based on the specific action sensor;
  if the tractor does not have a specific action sensor, determining whether the tractor has a further sensor;
  if the tractor has the further sensor, detecting the activity of the tractor based on the further sensor;
  if the tractor does not have the further sensor, determining whether the tractor has an RFID tag;
  if the tractor has the RFID tag, determining the tractor activity based on a default activity of the RFID tag; and
  if the tractor does not have the RFID tag, determining the tractor activity based on a default activity for the tractor.

6. The method of claim 1, wherein the current location is determined using a global navigation satellite system receiver.

7. The method of claim 1, wherein the threshold distance is three meters.

8. The method of claim 1, wherein the current location of the tractor is a received current location.

9. The method of claim 1, wherein the current location of the tractor is a calculated current location, and wherein the calculated current location is determined by a process including steps of:
  receiving a block map for an agricultural block, wherein the block map includes locations of a plurality of rows within the agricultural block;
  receiving a current data sample relating to a tractor spraying in the agricultural block, wherein the current data sample includes a received current location of the tractor;
  evaluating an accuracy of the received current location;
  comparing the accuracy of the received current location to a threshold accuracy;
  if the received current location is more accurate than the threshold accuracy, determining the calculated current location of the tractor by comparing the received current location to the plurality of rows of the block map and selecting a closest one of the rows to the received current location;
  if the received current location is less accurate than the threshold accuracy, determining the calculated current location of the tractor by comparing the received current location to a plurality of recent previous locations of the tractor.

10. The method of claim 9, wherein the accuracy of the current location is received from a global navigation satellite system receiver.

11. The method of claim 10, wherein the predetermined accuracy is three meters.

12. The method of claim 9, wherein the threshold accuracy is a predetermined accuracy.

13. The method of claim 9, wherein the step of comparing the current location to the plurality of recent previous locations comprises determining whether the plurality of recent previous locations had good accuracy and were assigned to a line of samples, and assigning the current sample to the line of samples if the plurality of recent previous locations had good accuracy and were assigned to a line of samples.

14. A method, comprising:
receiving a block map for an agricultural block, wherein the block map includes locations of a plurality of rows within the agricultural block;
receiving a current data sample relating to a tractor spraying in the agricultural block, wherein the current data sample includes a current location of the tractor;
evaluating an accuracy of the current location;
comparing the accuracy of the current location to a threshold accuracy;
if the current location is more accurate than the threshold accuracy, determining a current location of the tractor by comparing the current location to the plurality of rows of the block map and selecting a closest one of the rows to the current location;
if the current location is less accurate than the threshold accuracy, determining the current location of the tractor by comparing the current location to a plurality of recent previous locations of the tractor.

15. The method of claim 14, wherein the accuracy of the current location is received from a global navigation satellite system receiver.

16. The method of claim 14, wherein the threshold accuracy is a predetermined accuracy.

17. The method of claim 16, wherein the predetermined accuracy is three meters.

18. The method of claim 14, wherein the step of comparing the current location to the plurality of recent previous locations comprises determining whether the plurality of recent previous locations had good accuracy and were assigned to a line of samples, and assigning the current sample to the line of samples if the plurality of recent previous locations had good accuracy and were assigned to a line of samples.

* * * * *